United States Patent [19]

Flasza

[11] Patent Number: 4,460,918

[45] Date of Patent: Jul. 17, 1984

[54] AUTOMATIC SWITCHING CIRCUIT FOR A DUAL MODE TELEVISION RECEIVER

[75] Inventor: Michael D. Flasza, Schaumburg, Ill.

[73] Assignee: Zenith Electronics Corporation, Glenview, Ill.

[21] Appl. No.: 398,022

[22] Filed: Jul. 14, 1982

[51] Int. Cl.³ .................... H04N 9/535; H04N 5/22
[52] U.S. Cl. .................................. 358/21 R; 358/22; 358/181; 358/33
[58] Field of Search ............... 358/11, 21 R, 33, 181; 360/33.1; 369/6; 340/721, 745, 715, 706; 273/DIG. 28

[56] References Cited

U.S. PATENT DOCUMENTS

| | | | |
|---|---|---|---|
| 3,969,755 | 7/1976 | Arimura et al. | 358/330 |
| 4,139,865 | 2/1979 | Iida et al. | 358/188 |
| 4,149,186 | 4/1979 | Chung et al. | 358/83 |
| 4,151,557 | 4/1979 | Iida et al. | 360/33.1 |
| 4,167,704 | 9/1979 | Sato et al. | 360/33 |
| 4,312,016 | 1/1982 | Glaab et al. | 358/188 |

Primary Examiner—John C. Martin
Assistant Examiner—E. A. McDowell

[57] ABSTRACT

A television signal receiving apparatus having a first input for receiving a composite video signal and a second input for receiving a direct-drive RGB signal includes an electronic switching circuit for automatically switching between composite video and RGB modes of operation. The switching circuit is responsive to the presence of the sync component of an RGB signal at the second input for automatically establishing the RGB mode of operation wherein only the input RGB signal is used to form the image display and is responsive to the absence of the sync component of the RGB signal at the second input for establishing the composite video mode of operation wherein the composite video signal at the first input is used to form the image display. Provisions are included for developing an override signal for allowing the development of a mixed mode image display.

10 Claims, 3 Drawing Figures

AUTOMATIC SWITCHING CIRCUIT FOR A DUAL MODE TELEVISION RECEIVER

BACKGROUND OF THE INVENTION

The present invention relates generally to video image reproducing apparatus and, more particularly, concerns a novel circuit for automatically switching a video image reproducing apparatus between composite video and RGB modes of operation.

Color television receivers and color video monitors are presently being designed with the ability of operate in response to standard composite video input signals (according to the NTSC system) as well as in response to direct-drive RGB input signals. Composite video signals are typically derived from television receiver tuners, video cassette recorders, video cameras and the like and include a luminance component (band limited to about 3.5 MHz), a color or chrominance component (band limited to about 1.0 MHz) and a composite sync component. The luminance and chrominance components of the composite video signal are processed by the color television receiver or color video monitor for reproducing red, green and blue (RGB) video drive signals which are coupled to a cathode ray tube (CRT) for reproducing a color video image. More recently, color television receivers and color video monitors have been designed which are capable of operating directly in response to RGB input signals for reproducing an extremely high quality video image. Sources of such direct-drive RGB signals typically include desktop computers, teletext decoders, some video games and the like.

In prior art color television receivers and color video monitors having the capability of operating in response to both standard composite video input signals and direct-drive RGB signals manual switches have been employed to select the desired mode of operation, i.e. composite video or direct-drive RBG modes of operation. It is often desired to relieve the viewer of the necessity of having to manually switch the television receiver or monitor to the desired mode of operation.

U.S. Pat. No. 4,139,865 discloses a circuit for use with a television receiver and a VTR (video tape recorder). The circuit provides for selection of television receiver or VTR reproducing modes of operation by means of push button switches. More particularly, channel selection in the normal television mode of operation is effected electronically with channel selection push button switches. An additional push botton switch is provided for switching to the VTR mode of operation. When it is desired to return to the normal television mode of operation, a channel selection push button switch is depressed and the television mode is automatically re-established. Although this circuit provides for automatically re-establishing the television mode of operation, it still requires the operator to manually effect the VTR mode of operation.

It is a basic object of the present invention to provide a switching circuit for a video image reproducing apparatus, e.g. a color television receiver or video monitor, which automatically effects switching between composite video and direct-drive RGB modes of operation.

It is a more specific object of the invention to provide a switching circuit for a duel-mode color television receiver or color video monitor which automatically establishes composite video or direct-drive RGB modes of operation in accordance with the absence or the presence respectively of the sync component of a direct-drive RGB input signal.

BRIEF DESCRIPTION OF THE DRAWINGS

The features of the present invention which are believed to be novel are set forth with particularity in the appended claims. The invention, together with the objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
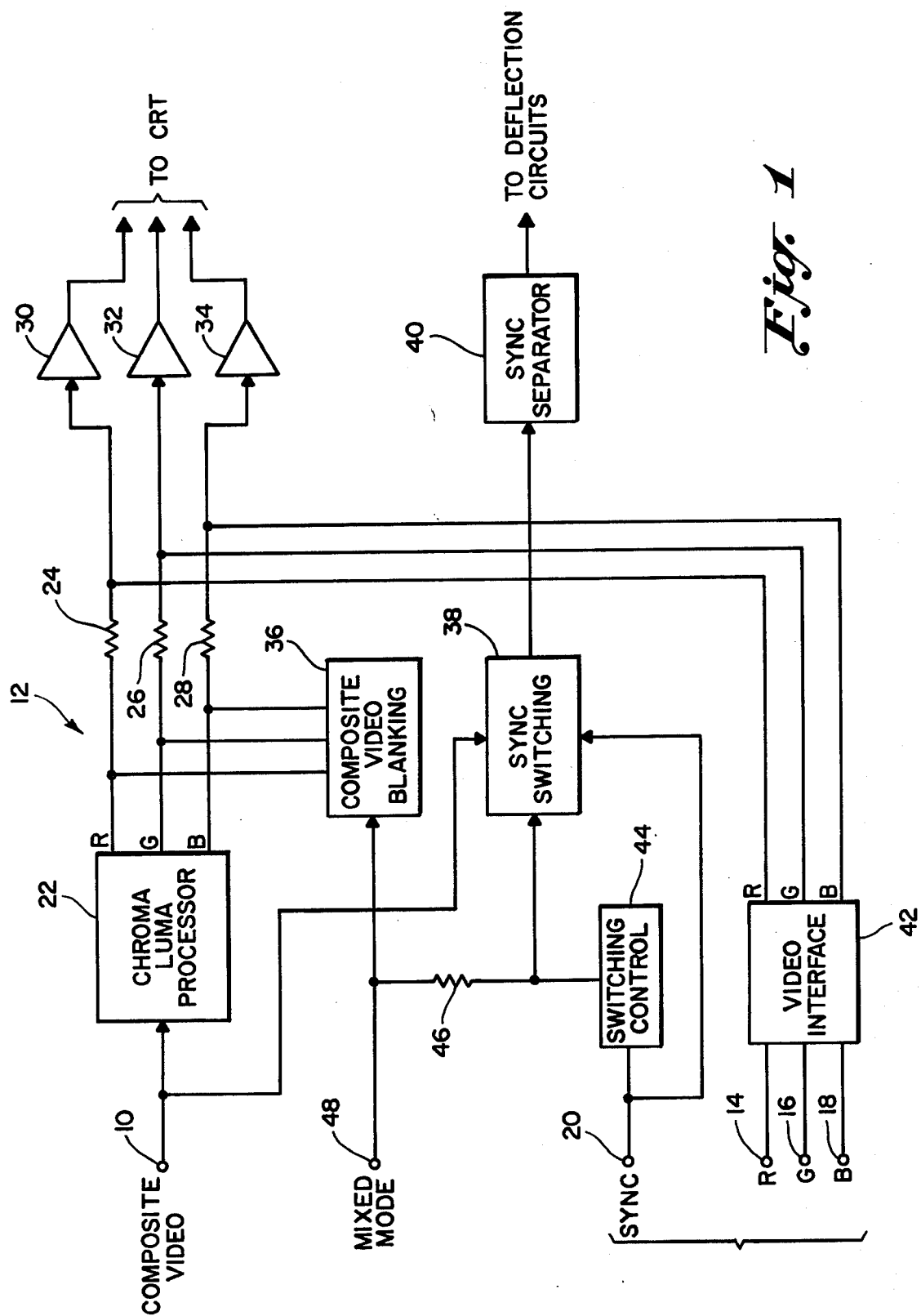
FIG. 1 is a block diagram of the novel automatic switching circuit of the invention.

Referring to FIG. 1, a standard NTSC composite video signal defining a first video image is developed on a first input terminal 10 of a video image reproducing apparatus 12 such as a color television receiver or a color video monitor. To simplify the explanation of the present invention only those portions of video image producing apparatus 12 partinent to an understanding of the invention are illustrated in the drawing. As is well known in the art, the composite video signal includes a composite sync component, a band-limited luminance component, and a band-limited chrominance component, the latter two components being combinable for forming individual red, green and glue video drive signals which are normally coupled to a CRT for reproducing the first video image. The video image reproducing apparatus 12 is also adapted for reproducing a second video image in accordance with a direct-drive RGB input signal comprising individual wide-band red, green and blue video signals developed on input terminals 14, 16 and 18 respectively and a composite sync signal developed on a input terminal 20. For purposes of illustration, the composite video signal developed on input terminal 10 may be derived from a conventional television receiver tuner while the direct-drive RGB signal developed on input terminals 14-20 may be derived from the output of a computer, video game or the like.

In general terms, the present invention provides an electronic signal switching circuit for automatically switching video image reproducing apparatus 12 between composite video and RGB modes of operation for reproducing either the first or second video image depending upon the presence or absence of a direct-drive RGB input signal at input terminals 14-20. In particular, in the absence of a direct-drive RGB input signal at input terminals 14-20, the switching circuit will automatically place video image reproducing apparatus 12 in a composite video mode of operation for reproducing the first video image in accordance with the composite video signal developed at input terminal 10. On the other hand, in the presence of a direct-drive RGB input signal at input terminals 14-20, video image reproducing apparatus 12 will be automatically switched to an RGB mode of operation for reproducing the second video image whether or not a composite video signal is being simultaneously supplied to input terminal 10. As a result, the viewer need only activate the video sources supplying the composite video and direct-drive RGB signals as desired without having no manually switch video image reproducing apparatus 12 to a corresponding mode of operation for reproducing the selected video image.

Returning now to FIG. 1, the composite video signal developed at input terminal 10 is coupled to a conventional chroma-luma processor 22 which develops corresponding red, green and glue video output signals. The red, green and blue video output signals developed by chroma-luma processor 22 are coupled by isolating resistors 24, 26 and 28 respectively to the inputs of red, green and glue video output amplifiers 30, 32 and 34 and therefrom to the CRT (not shown) of video image reproducing apparatus 12 for reproducing the first video image. In addition, the red, green and blue video signals developed by chroma-luma processor 22 are coupled to a composite video blanking circuit 36 which, when enabled, is effective for shunting the video signals for blanking the display produced in response thereto on the viewing screen of the CRT. The composite video signal developed at input terminal 10 is also coupled to a first input of a sync switching circuit 38 which has an output supplying a conventional sync separator 40. The output of sync separator 40 is supplied to the deflection circuits (not shown) of video image reproducing apparatus 12 for suitably synchronizing the raster thereof.

The red, green and blue video components of the direct-drive RGB signal developed at input terminals 14–18 are coupled through a video interface circuit 42 to the inputs of the red, green and blue video amplifiers 30, 32 and 34 respectively and therefrom to the CRT of video image reproducing apparatus 12 for reproducing the second video image. Video interface circuit 42 serves to condition and appropriately translate the input red, green and blue video signals to levels compatible with the operation of the video output amplifiers. The sync component of the direct-drive RGB signal developed at input terminal 20 is coupled to a switching control circuit 44 and also to a second input of sync switching circuit 38. The output of switching control 44 is supplied to a control input of sync switching circuit 38 for selectively coupling either the sync component of the composite video signal or the sync component of the direct-drive RGB signal to sync separator 40 for application to the deflection circuits of image reproducing apparatus 12. The output of switching control circuit 44 is also applied via an isolating resistor 46 to the control input of composite video blanking circuit 36 for selectively enabling composite video blanking circuit 36 to blank the red, green and blue video output signals developed by chroma-luma processor 22.

More specifically, switching control circuit 44 is responsive to the absence of the sync component of an input direct-drive RGB signal at input terminal 20 for (1) disabling composite video blanking circuit 36 for allowing the video output signals developed by chroma-luma processor 22 to be coupled by video output amplifiers 30–34 to the CRT of image reproducing apparatus 12 and (2) for operating sync switching circuit 38 for coupling the composite video signal from input terminal 10 to sync separator 40. As a consequence, in the absence of a direct-drive RGB input signal at input terminals 14–20, video image reproducing apparatus 12 will be automatically placed in a composite video mode of operation wherein the first video image will be reproduced in response to the red, green and blue video signals and the sync signal derived from the composite video signal developed at input terminal 10.

On the other hand, if a direct-drive RGB input signal is supplied to input terminals 14–20, switching control circuit 44 is responsive to the sync component thereof for (1) enabling composite video blanking circuit 36 so as to blank the video output signals developed by chroma-luma processor 22 and (2) for operating sync switching 38 for coupling the sync component of the direct-drive RGB input signal from input terminal 20 to sync separator 40 for application to the deflection circuits of video image reproducing apparatus 12. In this case, video image reproducing apparatus 12 will automatically assume as RGB mode of operation wherein the second video image will be reproduced in response to the red, green and blue video signals developed at the output of interface circuit 42 and the sync signal supplied to the deflection circuits by sync switching circuit 38 from input terminal 20. It will be noted that the RGB mode of operation is assumed by video image reproducing apparatus 12 regardless of the application of a composite video signal to input terminal 10. Thus, video image reproducing apparatus 12 will automatically assume an RGB mode of operation as soon as a input direct-drive RGB signal is presented to input terminals 14–20 for reproducing the video image represented thereby whether or not a composite video signal is being simultaneously presented to input terminal 10.

Sometimes, it is desirable to display the video images defined by both video input signals (i.e. the composite video signal and the direct-drive RGB signal) on the viewing screen of video image reproducing apparatus 12 at the same time. This mixed mode of operation may be effected by disabling composite video blanking circuit 36 in response to a mixed mode control signal developed at an input terminal 48. With composite video blanking circuit 36 disabled, the CRT of video image reproducing apparatus 12 is supplied with red, green and blue video signals from the outputs of both chroma-luma processor 22 (representing the composite video signal developed at input terminal 10) and video interface circuit 42 (representing the direct-drive RGB input signal). Sync switching circuit 38 will, of course, be operable for coupling the sync component of the direct-drive RGB input signal to the deflection circuits of video image reproducing apparatus 12 during the mixed mode of operation.

Figure 2:
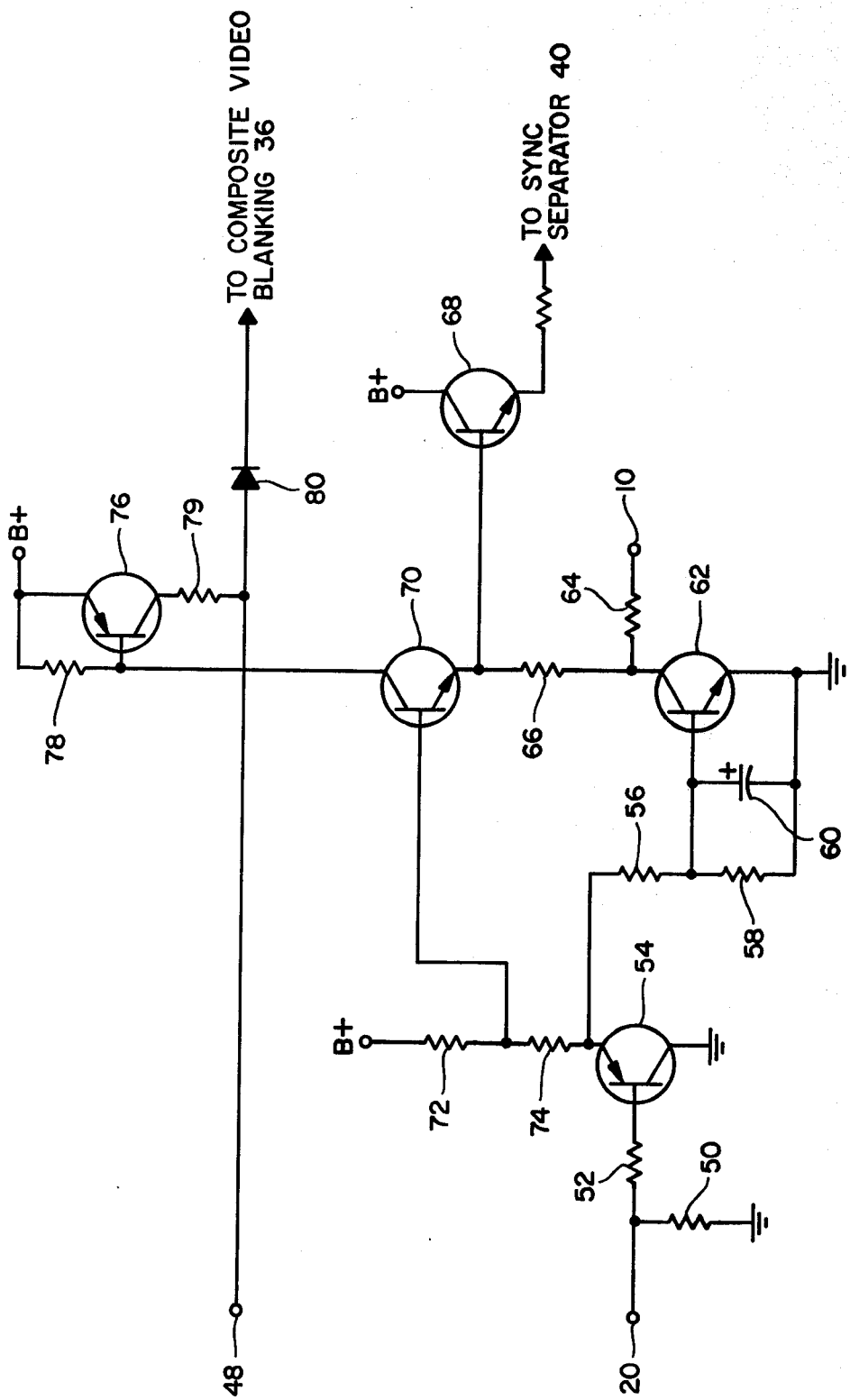
FIGS. 2 and 3 are schematic diagrams of portions of the circuit shown in FIG. 1.

FIG. 2 schematically illustrates an embodiment of sync switching circuit 38 and switching control circuit 44. The sync component of an input direct-drive RGB signal received at input terminal 20 is applied through a pair of resistors 50 and 52 to the base of an input transistor 54. The emitter of transistor 54 is coupled by a resistor 56 to the base of a transistor 62, the parallel combination of a resistor 58 and a capacitor 60 being connected between the base and emitter terminals of transistor 62. The collector of transistor 62 is coupled by a resistor 64 to input terminal 10 for receiving the composite video signal and by a resistor 66 to the emitter of another transistor 70. The base of transistor 70 is connected to a voltage divider comprising a pair of resistors 72 and 74 connected between a source of positive potential B+ and the emitter of transistor 54. The emitter of transistor 70 is coupled by a transistor 68 to the input of sync separator 40 while the collector of the transistor is connected to the base of a final transistor 76 and by a resistor 78 to positive potential B+. The emitter of transistor 76 is also connected to positive potential B+ and its collector is coupled by a resistor 79 and a diode 80 to the control input of composite video blanking circuit 36. Mixed mode input terminal 48 is connected to the junction formed between resistor 79 and diode 80.

When an RGB source is not being used or is turned off, the base of transistor 54 is held low by resistor 50 thereby rendering the transistor conductive. Therefore, both transistors 62 and 70 will be non-conductive whereby the composite video signal will be applied from input termianl 10 through resistors 64 and 66 and transistor 68 to sync separator 40. Also, since transistor 70 is non-conductive, transistor 76 will be in a non-conducting state whereby a low-level signal is coupled to the control input of composite video blanking circuit 36 disabling its blanking function and establishing the composite video mode of operation. As described previously, in this mode of operation, a video image will be produced in response to the video and sync components of the input composite video signal.

Now, assume that an RGB source is connected to input terminals 14–20 and turned on. The sync component of the input RGB signal developed at input terminal 20 is now coupled by transistor 54 to the base of transistor 70. Also, the DC signal developed across capacitor 60 causes transistor 62 to conduct thereby shunting the composite video signal from input terminal 10 to ground. The sync component of the input RGB signal developed at the base of transistor 70 is now applied from its emitter through transistor 68 to sync separator 40 for synchronizing the raster to the input RGB signal.

In addition, since transistor 70 is conductive, transistor 76 will also be conductive whereby a high-level signal is coupled through diode 80 for enabling composite video blanking circuit 36. As a result, the video signals developed at the output of chroma-luma processor 22 will be blanked so that only the red, green and blue video signals developed at the output of video interface circuit 42 are coupled through video output stages 30–34 for application to the CRT.

It will be noted that, although the composite video signal developed at input terminal 10 will be blanked whenever the sync component of an input RGB signal is present at terminal 20, this blanking function may be overriden by supplying a low-level signal to mixed-mode terminal 48. By so disabling composite video blanking circuit 36 when both composite video and direct-drive RGB input signals are present, a mixed-mode display consisting of two superimposed video images can be provided on the display screen of the CRT.

Figure 3:
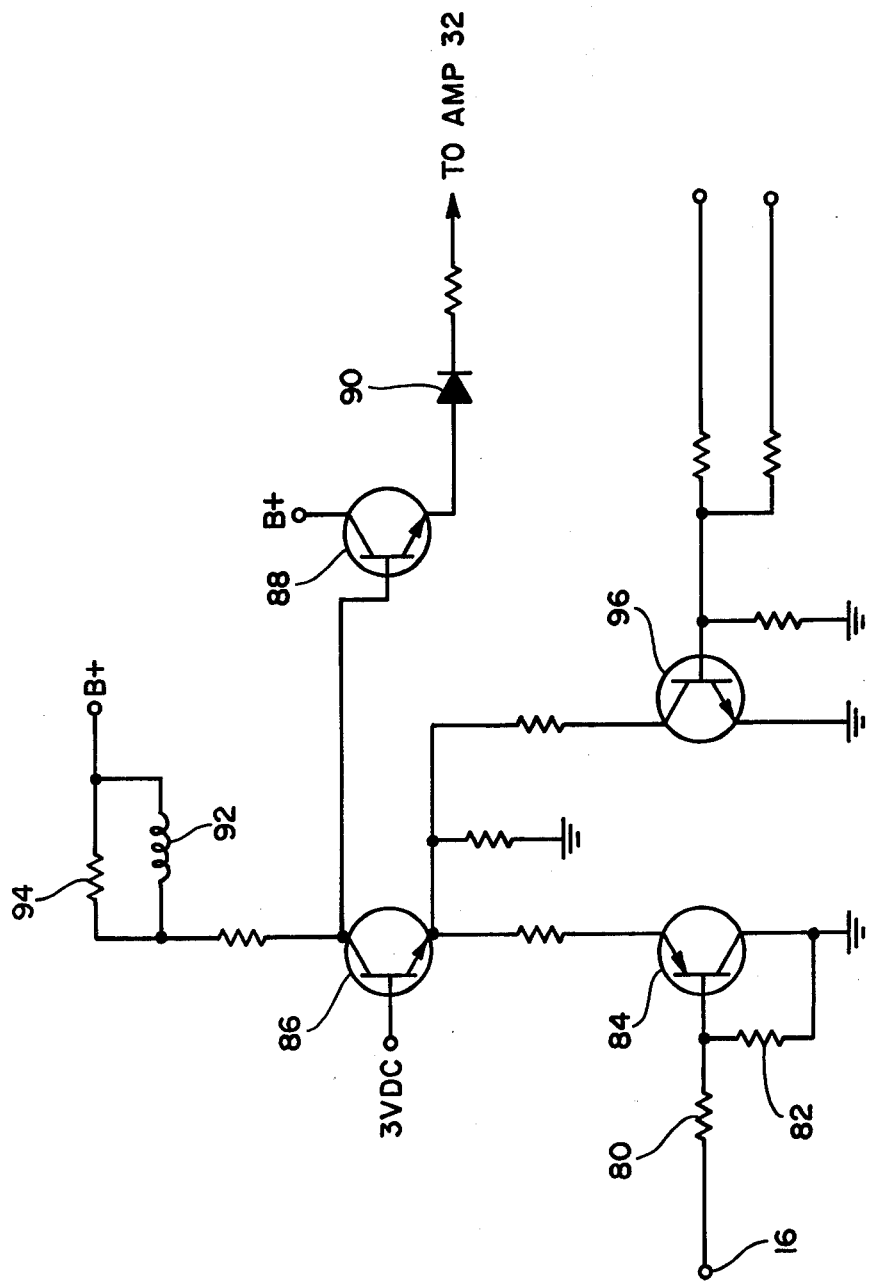

FIG. 3 schematically illustrates one section (the green video signal processing section) of video interface circuit 42. The red and blue circuits are identical and therefor have not been illustrated for purposes of clarity. The green video component of the direct-drive RGB input signal is coupled from input terminal 16 through a pair of resistors 80 and 82 to the base of an input transistor 84. The green video signl is then applied from the emitter of transistor 84 thru a pair of signal conditioning and level translating transistors 86 and 88 to an isolating diode 90 for application to the green video output amplifier 32. A peaking circuit comprising the parallel combination of an inductor 92 and a resistor 94 may be connected between a supply of positive potential and the base of transistor 88 to peak the video signal.

In order to provide a composite blanking function for a direct-drive RGB input signal the horizontal flyback and vertical high signals developed by video image reproducing apparatus 12 are coupled to the base of a transistor 96 whose collector is resistively coupled to the emitter of transistor 86. Thus, in response to the occurence of either a horizontal flyback signal or a vertical high signal, transistor 96 will be rendered conductive pulling down the emitter of transistor 86 and thereby blanking the image presented on the viewing screen of the image reproducing apparatus.

The invention is not limited to the particular details of the apparatus depicted and other modifications and applications are contemplated. Certain other images may be made in the above-described apparatus without departing from the true spirit and scope of the invention here involved. It is intended, therefor, that the subject matter in the above depiction shall be interpreted as illustrative and not in a limiting sense.

I claim:

1. In a television signal receiving apparatus having red, green and blue video output stages, a first input for receiving a composite video signal and a second input for receiving an RGB signal including a sync component and red, green and blue video components, an electronic signal switching circuit comprising:
    means coupling the red, green and blue video components of the RGB signal from the second input to said red, green and blue video output stages respectively;
    chroma-luma processing means for deriving red, green and blue video components from the composite video signal received at the first input;
    means for coupling said derived red, green and blue video components to said red, green and blue video output stages respectively; and
    composite video blanking means operable in response to the presence of the sync component of the RGB siganl at the second input for blanking said derived red, green and blue video components.

2. An electronic signal switching circuit according to claim 1 including means for isolating the red, green and blue video components of the RGB signal coupled to said video output stages from said composite video blanking means.

3. An electronic signal switching circuit according to claim 1 including viewer operable means for developing a mixed mode signal for overriding said composite video blanking means so as to allow the red, green and blue video components of the RGB signal and the derived red, green and blue video components to be coupled to said red, green and blue video output stages respectively.

4. An electronic signal switching circuit according to claim 1 wherein said television signal receiving apparatus includes a sync processing circuit and including sync switching means operable in response to the presence of the sync component of the RGB signal at the second input for coupling the sync component of the RGB signal to said sync processing circuit and otherwise operable for coupling the composite video signl from the first input to the sync processing circuit.

5. An electronic signal switching circuit according to claim 4 including switching control means responsive to the sync component of the RGB signal at the second input for operating said composite video blanking means and said sync switching means.

6. An electronic signal switching circuit according to claim 4 wherein said television signal receiving apparatus includes means for developing a horizontal flyback signal and a vertical high signal and including means for clamping each of said red, green and blue video components of the RGB signal coupled to said video output stages to a blanking level in response to said horizontal flyback signal and said vertical high signal.

7. In a television signal receiving apparatus having a sync processing circuit, red, green and blue video output stages, a first input for receiving a composite video signal and a second input for receiving an RGB signal including a sync component and red, green and blue video components, an electronic signal switching circuit comprising:

means coupling the red, green and blue video components of the RGB signal from the second input to said red, green and blue video output stages respectively;

chroma-luma processing means for deriving red, green and blue video components from the composite video signal received at the first input;

means for coupling said derived red, green and blue video components to said red, green and blue video output stages respectively;

switching control means for developing a control signal in response to the presence of the sync component of the RGB signal at said second input;

composite video blanking means responsive to said control signal for blanking said derived red, green and blue video components; and sync switching means responsive to said control signal for coupling the sync component of the RGB signal to said sync processing circuit and otherwise coupling the composite video signal from the first input to the sync processing circuit.

8. An electronic signal switching circuit according to claim 7 including means for isolating the red, green and blue video components of the RGB signal coupled to said video output stages from said composite video blanking means.

9. An electronic signal switching circuit according to claim 7 including viewer operable means for developing a mixed mode signal for overriding said composite video blanking means so as to allow the red, green and blue video components of the RGB signal and the derived red, green and blue video components to be coupled to said red, green and blue video output stages respectively.

10. An electronic signal switching circuit according to claim 7 wherein said television signal receiving apparatus includes means for developing a horizontal flyback signal and a vertical high signal and including means for clamping each of said red, green and blue video components of the RGB signal coupled to said video output stages to a blanking level in response to said horizontal flyback signal and said vertical high signal.

* * * * *